March 19, 1963 V. J. KEGG 3,081,958
DEVICE FOR MEASURING COIL DIAMETERS
Filed Jan. 19, 1961
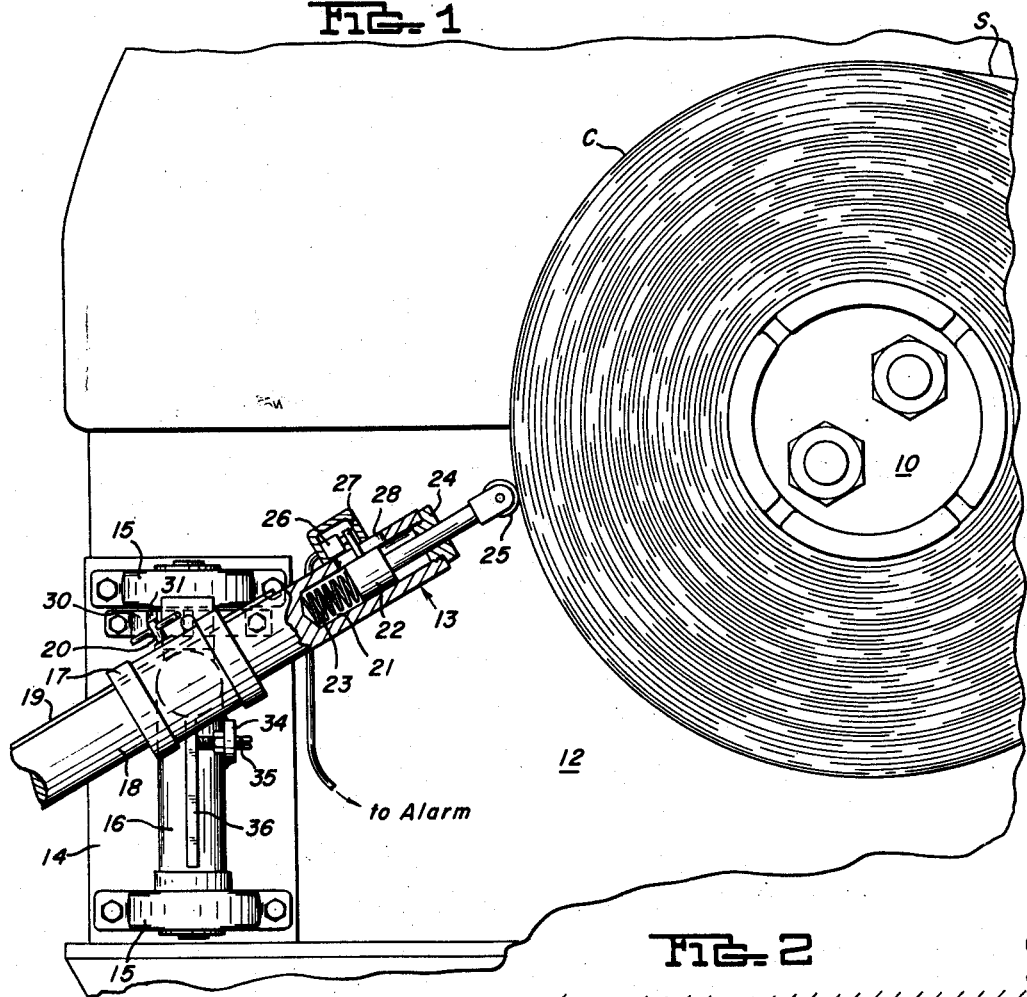
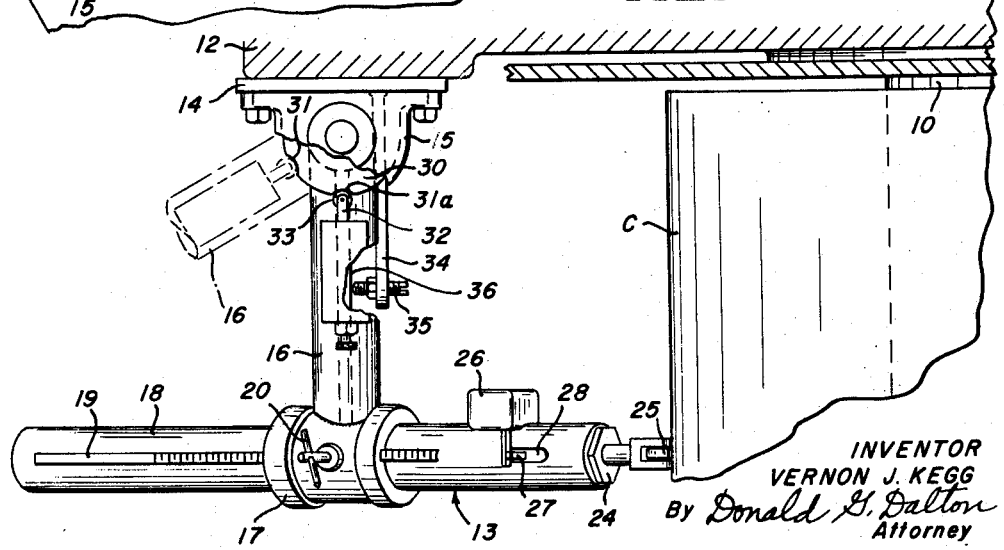
INVENTOR
VERNON J. KEGG
By Donald G. Dalton
Attorney

United States Patent Office 3,081,958
Patented Mar. 19, 1963

3,081,958
DEVICE FOR MEASURING COIL DIAMETERS
Vernon J. Kegg, Leechburg, Pa., assignor to United States Steel Corporation, a corporation of New Jersey
Filed Jan. 19, 1961, Ser. No. 83,732
3 Claims. (Cl. 242—57)

This invention relates to a device for measuring the diameter of a coil of strip material as it winds.

Although the invention is not thus limited, the device is particularly useful for indicating when a coil of metal strip builds up to a predetermined diameter as it winds on a coiling mandrel. The final diameter to which a coil of metal strip is wound varies with several factors, such as the thickness and width of the strip and individual customer specifications. Commonly when a coil approaches its final diameter, it is necessary for an operator several times to stop winding, manually measure its diameter, and refer to a chart to determine whether the proper diameter has been reached. This procedure is unduly laborious and time consuming.

An object of the present invention is to provide an improved measuring device which can be adjusted beforehand for a particular coil diameter and indicates automatically when a coil reaches this diameter.

A further object is to provide an improved measuring device which has the foregoing characteristics and is of simple construction and adapted for installation on existing equipment without otherwise altering the structure.

In accomplishing these and other objects of the invention, I have provided improved details of structure, a preferred form of which is shown in the accompanying drawing, in which:

FIGURE 1 is a side elevational view, with parts broken away, showing my improved measuring device and its relation to a coil of strip material; and FIGURE 2 is a top plan view of the structure shown in FIGURE 1.

The drawing shows a conventional coiling mandrel 10, which is journaled in a housing 12 and is power-driven by any suitable mechanism, not shown. A metal strip S from preceding processing equipment winds on the mandrel to form a coil C. A measuring device 13, constructed in accordance with my invention, is mounted on the housing 12 on the side of the mandrel opposite that from which the strip enters.

The measuring device 13 comprises a base plate 14 bolted to the housing 12, upper and lower pillow blocks 15 fixed to the base plate, and a bracket 16 pivotally supported in the pillow blocks to swing on a vertical axis. Bracket 16 includes a supporting sleeve 17 (conveniently a pipe T) fixed at its free end. A rod 18 is mounted in sleeve 17 for sliding adjustment, and carries a longitudinal key 19 which is received in a corresponding keyway in the interior of the sleeve. A set screw 20 is threadedly engaged with the sleeve and bears against key 19 to hold the rod in adjusted position with respect to the sleeve. One end of rod 18 has an axial bore 21 which houses a plunger 22 and a compression spring 23 urging the plunger outwardly. A bushing 24 is threadedly engaged with the end of the rod to close the bore. A contact wheel 25 is journaled to the outer or free end of plunger 22 to rotate on an axis parallel to the mandrel axis, commonly a horizontal axis. Rod 18 also carries a microswitch 26. Plunger 22 carries a cooperating contact arm 27 which projects through a slot 28 in the rod to operate the microswitch. A suitable signalling device, such as an alarm or buzzer, is electrically connected to the microswitch to be energized when the switch closes.

The base plate 14 carries a semicircular positioning plate 30, which has shallow depressions 31 and 31a in its edge. The upper edge of bracket 16 carries a cooperating spring-loaded detent 32, which preferably has a roller 33 journaled at its end. Bracket 16 can swing to an out-of-the-way position in which depression 31 receives roller 33 or to an operative position in which depression 31a receives the roller. An arm 34 is fixed to the base plate 14 below the upper pillow block 15. A positioning screw 35 is threadedly engaged with this arm. Bracket 16 includes a web 36 which abuts this screw when the bracket is moved to its operative position.

In operation, I first adjust the position of rod 18 in sleeve 17 in accordance with the diameter of coil C which I wish to wind on mandrel 10. Preferably the upper face of key 19 is suitably graduated to facilitate this adjustment. After tightening the set screw 20, I swing bracket 16 to its operative position in which it abuts the positioning screw 35, and the depression 31a receives the roller 33. As coil C builds up, it ultimately reaches a diameter sufficient to contact the wheel 35, whereupon plunger 22 is pushed inwardly to close the microswitch 26 and actuate the indicating device. I then know the coil has reached its desired final diameter. Roller 33 easily rides out of the depression 31a if there is any delay in stopping the mandrel, thus preventing damage to the equipment.

From the foregoing description it is seen my invention affords a simple readily adjusted device for automatically indicating when a coil of strip material has been wound to a predetermined size. The device is readily installed on the housing of an existing conventional coiling mandrel without otherwise altering its structure, and offers no interference with normal operation.

While I have shown and described only a single embodiment of my invention, it is apparent that modifications may arise. Therefore, I do not wish to be limited to the disclosure set forth but only by the scope of the appended claims.

I claim:

1. The combination, with a strip coiling mandrel and a housing in which said mandrel is journaled, of a device for indicating when a coil winding on said mandrel has built up to a predetermined diameter, said device comprising support means fixed to said housing, a bracket pivoted to said support means, a rod adjustably mounted on said bracket, contact means mounted on said rod, said bracket being pivotally movable about said support means between an operative position in which said contact means lies in the path of a coil building up on said mandrel and an inoperative position in which the device is clear of the path of the coil, an arcuate positioning plate fixed to said support means and having at least one notch in its edge, a cooperating spring-loaded detent carried by said bracket and engaging said notch when the bracket is in its operative position, and indicating means operatively connected with said contact means, said contact means in the operative position of said bracket being engageable by the coil when the coil has built up to the predetermined diameter for actuating said indicating means, pivoting said bracket away from its operative position, and releasing said detent from said notch.

2. A combination as defined in claim 1 in which said plate has a second notch spaced from said first-named notch and said detent engages said second notch when said bracket is in its inoperative position, and in which said device also comprises a fixed stop carried by said support means and engageable by said bracket in its operative position for positively limiting movement of the bracket toward the mandrel.

3. The combination, with a strip coiling mandrel and a housing in which said mandrel is journaled, of a device for indicating when a coil winding on said mandrel has built up to a predetermined diameter, said device comprising support means fixed to said housing, a bracket pivoted to said support means, a sleeve fixed to said bracket and spaced from said support means, a rod mounted in said sleeve for sliding adjustment, means fixing said rod in adjusted position in said sleeve, said rod having an axial bore extending from one end, a plunger housed in said bore and extending beyond the end of said rod, spring means in said bore urging said plunger outwardly with respect to said rod, a contact wheel journaled to the outer end of said plunger, said bracket being pivotally movable about said support means between an operative position in which said wheel lies in the path of a coil building up on said mandrel and an inoperative position in which the device is clear of the path of the coil, an arcuate positioning plate fixed to said support means and having at least one notch in its edge, a cooperating spring-loaded detent carried by said bracket and engaging said notch when the bracket is in its operative position, an electric switch carried by said rod, operating means carried by said plunger for actuating said switch when said wheel engages a coil and moves said plunger inwardly against the action of said spring means, and indicating means operatively connected with said switch, said bracket pivoting away from its operative position and said detent moving out of said notch on engagement of said wheel with the coil.

References Cited in the file of this patent
UNITED STATES PATENTS

| | | |
|---|---|---|
| 1,208,646 | Power | Dec. 12, 1916 |
| 1,214,208 | Miller | Jan. 30, 1917 |
| 1,538,510 | Bonk | May 19, 1925 |
| 2,836,668 | Remington | May 27, 1958 |
| 2,844,674 | Anderson | July 22, 1958 |